US012393260B2

(12) United States Patent
Coenen

(10) Patent No.: US 12,393,260 B2
(45) Date of Patent: Aug. 19, 2025

(54) ADAPTIVE VOLTAGE SCALING WITH BODY BIASING

(71) Applicant: SEMICONDUCTOR COMPONENTS INDUSTRIES, LLC, Scottsdale, AZ (US)

(72) Inventor: Ivo Leonardus Coenen, Coffrane (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 182 days.

(21) Appl. No.: 18/338,288

(22) Filed: Jun. 20, 2023

(65) Prior Publication Data

US 2024/0302888 A1    Sep. 12, 2024

Related U.S. Application Data

(60) Provisional application No. 63/489,037, filed on Mar. 8, 2023.

(51) Int. Cl.
*G06F 1/3296* (2019.01)
*G06F 1/08* (2006.01)
*G06F 1/324* (2019.01)

(52) U.S. Cl.
CPC .............. *G06F 1/3296* (2013.01); *G06F 1/08* (2013.01); *G06F 1/324* (2013.01)

(58) Field of Classification Search
CPC .......... G06F 1/08; G06F 1/324; G06F 1/3243; G06F 1/3296
See application file for complete search history.

(56) References Cited

U.S. PATENT DOCUMENTS 6,414,527 B1 *  7/2002  Seno ............... G06F 1/3296
                                              327/158
6,944,780 B1    9/2005  Kranzen et al.
(Continued)

FOREIGN PATENT DOCUMENTS

WO    2010052607 A1    5/2010

OTHER PUBLICATIONS

Amrutur, Bharadwaj, et al. "Adaptative Techniques to Reduce Power in Digital Circuits". Jul. 4, 2011. Journal of Low Power Electronics and Applications. ISSN 2079-9268. pp. 261-276. (Year: 2011).*

(Continued)

*Primary Examiner* — Thomas J. Cleary
(74) *Attorney, Agent, or Firm* — Dickinson Wright PLLC; Jonathan A. Schnayer

(57) ABSTRACT

Integrated circuits on semiconductor substrates and methods for operating integrated circuits on semiconductor substrates. The method includes adjusting a clock signal, generated by a clock circuit, from a first frequency to a second frequency. The method also includes adjusting a digital supply voltage, generated by a digital supply voltage converter, to a predetermined maximum value for the second frequency. The method further includes adjusting a body biasing voltage, generated by a body voltage converter, to a predetermined value for the second frequency. The method also includes determining, by a controller, speed margins based on logic speed measurements from a logic gate delay line. The method further includes decreasing the digital supply voltage until the speed margins are less than a predetermined threshold margin. The clock circuit, the digital supply voltage converter, the body voltage converter, the controller, and the logic gate delay line are implemented on the semiconductor substrate.

17 Claims, 7 Drawing Sheets

(56) References Cited

U.S. PATENT DOCUMENTS

| | | | |
|---|---|---|---|
| 7,557,626 B1* | 7/2009 | Zortea | G06F 1/3296 327/158 |
| 8,522,188 B2* | 8/2013 | Kim | H10D 89/10 716/108 |
| 10,833,582 B1 | 11/2020 | Coenen | |
| 2002/0005750 A1 | 1/2002 | Kao et al. | |
| 2002/0029352 A1* | 3/2002 | Borkar | G06F 1/32 713/320 |
| 2004/0183588 A1* | 9/2004 | Chandrakasan | G05F 3/205 327/545 |
| 2005/0107967 A1* | 5/2005 | Patel | G01R 31/31718 702/64 |
| 2010/0333057 A1* | 12/2010 | Tang | G11C 11/4074 716/126 |
| 2020/0183486 A1* | 6/2020 | Kapoor | G06F 1/3296 |
| 2021/0191452 A1 | 6/2021 | Herberholz et al. | |
| 2022/0082615 A1 | 3/2022 | Genevey et al. | |
| 2023/0053440 A1 | 2/2023 | Coenen | |

OTHER PUBLICATIONS

Yan, Le, et al. "Joint Dynamic Voltage Scaling and Adaptive Body Biasing for Heterogeneous Distributed Real-Time Embedded Systems". Jul. 2005. IEEE Transactions on Computer-Aided Design of Integrated Circuits and Systems. vol. 24, No. 7. pp. 1030-1041. (Year: 2005).*

* cited by examiner

ADAPTIVE VOLTAGE SCALING WITH BODY BIASING

CROSS-REFERENCE TO RELATED APPLICATIONS

This application claims priority to and the benefit of U.S. Provisional Application Ser. No. 63/489,037 filed Mar. 8, 2023, titled "ADAPTIVE VOLTAGE SCALING WITH BODY BIASING," the entire disclosure of which is hereby incorporated by reference for all purposes.

BACKGROUND

Low power consumption plays a key role in battery-operated devices, such as hearing aids. Hearing aids include integrated circuits that perform a large amount of digital processing. The power consumption of digital logic in such battery-operated devices can be substantial and often accounts for the largest portion of the total power consumption.

SUMMARY

The power consumption of digital logic in battery-operated devices can be reduced by lowering the digital supply voltage to the lowest possible value required to run the digital logic at the used operating frequency, silicon process variation and temperature. Further, forward body biasing can be applied to increase the speed of the digital logic and lower the digital supply voltage further. Clock throttling can also be used to reduce power consumption in battery-operated devices by ensuring the fastest clock frequency is only used when a high processing load is present. However, when the system clock frequency changes, it can take a relatively long time to adjust the digital supply and body biasing voltages to the lowest possible values that still provide a sufficient speed margin for the new clock configuration. Thus, the present disclosure provides integrated circuits, integrated circuit packages, and methods that, among other things, perform rapid clock throttling by quickly adjusting to the lowest possible digital supply voltage using a last known optimal body biasing voltage for a newly-selected clock configuration. The present disclosure further provides integrated circuits, integrated circuit packages, and methods that, among other things, perform rapid clock throttling by measuring speed margins of digital logic components at short time intervals to quickly adjust the digital supply voltage close to the lowest possible value for a newly-implemented clock configuration.

The present disclosure provides a method for operating an integrated circuit on a semiconductor substrate. The method includes adjusting a clock signal, generated by a clock circuit, from a first frequency to a second frequency. The method also includes adjusting a digital supply voltage, generated by a digital supply voltage converter, to a predetermined maximum value for the second frequency. The method further includes adjusting a body biasing voltage, generated by a body voltage converter, to a predetermined value for the second frequency. The method also includes determining, by a controller, speed margins based on logic speed measurements from a logic gate delay line. The method further includes decreasing the digital supply voltage until the speed margins are less than a predetermined threshold margin. The clock circuit, the digital supply voltage converter, the body voltage converter, the controller, and the logic gate delay line are implemented on the semiconductor substrate.

The present disclosure also provides an integrated circuit on a semiconductor substrate. The integrated circuit includes, in one implementation, a processing core, a logic gate delate line, a clock circuit, a digital supply voltage converter, a body voltage converter, and a controller. The logic gate delay line is embedded within the processing core. The clock circuit is configured to generate a clock signal. The digital supply voltage converter is configured to generate a digital supply voltage. The body voltage converter is configured to generate a body biasing voltage. The controller is configured to adjust the clock signal from a first frequency to a second frequency. The controller is also configured to adjust the digital supply voltage to a predetermined maximum value for the second frequency. The controller is further configured to adjust the body biasing voltage to a predetermined value for the second frequency. The controller is also configured to determine speed margins based on logic speed measurements from the logic gate delay line. The controller is further configured to decrease the digital supply voltage until the speed margins are less than a predetermined threshold margin.

The present disclosure further provides an integrated circuit on a semiconductor substrate. The integrated circuit includes, in one implementation, a processing core, a system memory, a communication bus, a wireless communication circuit, and a controller.

The system memory is coupled to the processing core. The communication bus is coupled to the processing core. The wireless communication circuit is coupled to the communication bus. The wireless communication circuit is configured to communicate wirelessly to devices outside the integrated circuit. The controller is configured to adjust a clock signal from a first frequency to a second frequency. The controller is also configured to adjust a digital supply voltage to a predetermined maximum value for the second frequency. The controller is further configured to adjust a body biasing voltage to a predetermined value for the second frequency. The controller is also configured to determine speed margins based on logic speed measurements from the processing core. The controller is further configured to decrease the digital supply voltage until the speed margins are less than a predetermined threshold margin.

BRIEF DESCRIPTION OF THE DRAWINGS

For a detailed description of example implementations, reference will now be made to the accompanying drawings in which.

DEFINITIONS

Figure 1:
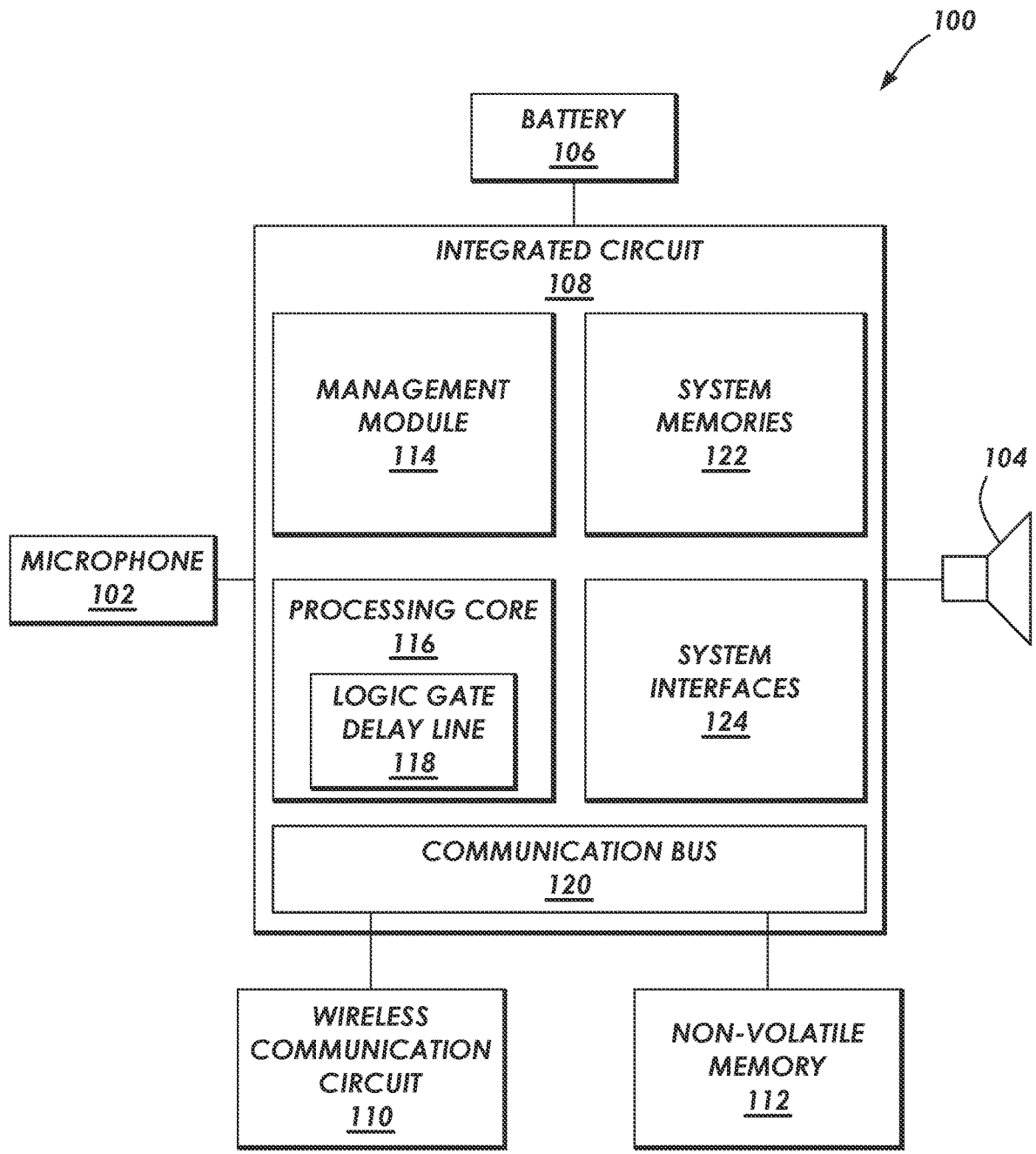
FIG. 1 is a block diagram of an example of a hearing aid with an integrated circuit in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to methods and systems of power management with adaptive voltage scaling and body biasing that allow rapid clock throttling. More particularly, various examples are directed to voltage converters and related controllers that, when the clock configuration changes, quickly adjust to the lowest possible digital supply voltage using a last known optimal body biasing voltage for the newly-implemented clock configuration. More particularly still, various examples are directed to voltage converters and related controllers that measure speed margins of digital logic components at short time intervals when the clock configuration changes to quickly adjust the digital supply voltage to a value close to the lowest possible value. The specification now turns to an example system to orient the reader.

FIG. 1 is a block diagram of an example of a hearing aid 100 in accordance with some implementations of the present disclosure. The hearing aid 100 illustrated in FIG. 1 includes a microphone 102, a speaker 104, a battery 106, an integrated circuit 108, a wireless communication circuit 110, and a non-volatile memory 112. The microphone 102, the speaker 104, and the battery 106 are electrically coupled to the integrated circuit 108. During operation, the hearing aid 100 receives sound through the microphone 102, converts the sound waves to electrical signals, and forwards the electrical signals to be processed by the integrated circuit 108. The processed signals are converted to sound waves by the speaker 104 and sent to an ear. As will be described in more detail below, the integrated circuit 108 includes a mechanism to adjust the power consumption by adaptively scaling a voltage provided to the various logic circuits of the integrated circuit 108. For example, the voltage provided to the logic circuits of the integrated circuit 108 can be reduced to levels that enable running the logic circuits at specified operating frequencies while taking into account silicon process and temperature variations.

The power for the hearing aid 100 illustrated in FIG. 1 is provided by the battery 106. In some implementations, a single battery is sufficient. In alternate implementations, multiple batteries may be used (for example, in series or in parallel). A variety of types of batteries can be used in the hearing aid 100, dependent on the type of the hearing aid 100. In some implementations, the battery 106 provides a supply voltage of less than 2 Volts. In some implementations, the battery 106 is rechargeable. In alternate implementations, the battery 106 is disposable.

The integrated circuit 108 illustrated in FIG. 1 includes a management module 114, a processing core 116 with a logic gate delay line 118 embedded therein, a communication bus 120, system memories 122, and system interfaces 124. Though not shown in FIG. 1, the management module 114 is coupled to all the circuits on the integrated circuit 108, and provides operational power. Further, though not shown in FIG. 1, the processing core 116, the system memories 122, and the system interfaces 124 are coupled to the communication bus 120. In some implementations, the communication bus 120 may be part of the system interfaces 124. The system interfaces 124 are configured to couple to additional external devices, such as an Electrically Erasable Programmable Read Only Memory (EEPROM), volume control circuitry, a fitting connector, push-button switches, and sensors. In some implementations, the wireless communication circuit 110 and the non-volatile memory 112 are electrically coupled to the integrated circuit 108 by way of the communication bus 120 as illustrated in FIG. 1. In alternate implementations, the wireless communication circuit 110 and the non-volatile memory 112 are electrically coupled to the integrated circuit 108 by way of separate communication buses (not specifically shown).

The system interfaces 124 may take any suitable form, such as a serial peripheral interface (SPI), Dual SPI (DSPI), a Quad SPI (QSPI), an I2C interface, an I3C interface, an interface for Pulse Coded Modulation (PCM) signals, a Universal Asynchronous Receiver/Transmitter (UART) circuit, a General Purpose Input/Output (GPIO) pin, an embedded MultiMediaCard (eMMC), and a Low-Speed A/D (LSAD) converter. SPI, DSPI, and QSPI are serial primary-secondary-based communication interfaces that are synchronous and full duplex, and may be three-wire or four-wire based. On the other hand, I2C and I3C are serial protocols based on two-wire interfaces, configured to support multi-master features. An example PCM interface may be used to stream audio signal data into and out of the integrated circuit 108. An example UART may include a logic circuit to transmit and receive asynchronous serial communication comprising data with a configurable format and a configurable speed. An example GPIO is a digital signal pin whose functionality, specifically input or output, may be determined during run-time. In some implementations, the GPIO pins may connect to external digital inputs such as push-buttons, or digital outputs such as a control or trigger of an external companion chip. The example eMMC may include an interface, a flash memory, and a flash memory controller, to provide an embedded non-volatile memory system. The example LSAD may provide analog-to-digital conversion of electrical signals for data processing purposes, and may include internal supply and ground inputs.

The processing core 116 carries out signal processing functionality, including a variety of Digital Signal Processing (DSP) algorithms as well as multiple types for wireless communication protocols. In some implementations, the processing core 116 includes at least one low-power DSP core, and a Reduced Instruction Set Computer (RISC). The processing core 116 may further includes a filter engine, and a plurality of hardware accelerators, which may be configurable. In some implementations, the processing core 116 may include a neural network hardware accelerator to implement a neural network functionality, including fetching a plurality of weights from a weights memory and carrying out a plurality of multiply-accumulate (MAC) operations that operate in parallel. The MAC operations may repetitively multiply an input value and a weight selected from the plurality of weights to accumulate the result of the multiplication to a sum of products representing a value corresponding to a neuron in the neural network.

The management module 114 includes circuitry configured to implement adaptive voltage scaling, to modify the voltage supplied to the logic circuits, and thereby reduce the power consumed by the hearing aid 100. The management module 114 also includes circuitry configured to implement body biasing. The management module 114 is communicatively coupled to the logic gate delay line 118 embedded within the processing core 116, and may read a measurement result created by the logic gate delay line 118. The logic gate delay line 118 and the measurement result therefrom are discussed in greater detail below. Nevertheless, once read, the measurement result is further processed by the management module 114 and used to control one or more power converters (for example, a switch-mode power converter and a charge pump) within the management module 114.

Still referring to FIG. 1, the integrated circuit 108 communicates with the wireless communication circuit 110 by way of the communication bus 120. In some implementations, the wireless communication circuit 110 includes a multi-protocol system-on-a-chip (SoC) to implement a variety of wireless communication related schemes. For example, the wireless communication circuit 110 may include a SoC to implement Bluetooth Low Energy (BLE) and/or a plurality of 2.4 GHz ultra-low-power wireless applications. Further, the non-volatile memory 112 illustrated in FIG. 1 is coupled to the integrated circuit 108 by way of the communication bus 120. The non-volatile memory 112 may include any suitable non-volatile member, such as an EEPROM, a flash memory, a mass storage device, or combinations thereof. The specification now turns to a more detailed description of the management module 114 and the processing core 116.

Figure 2:
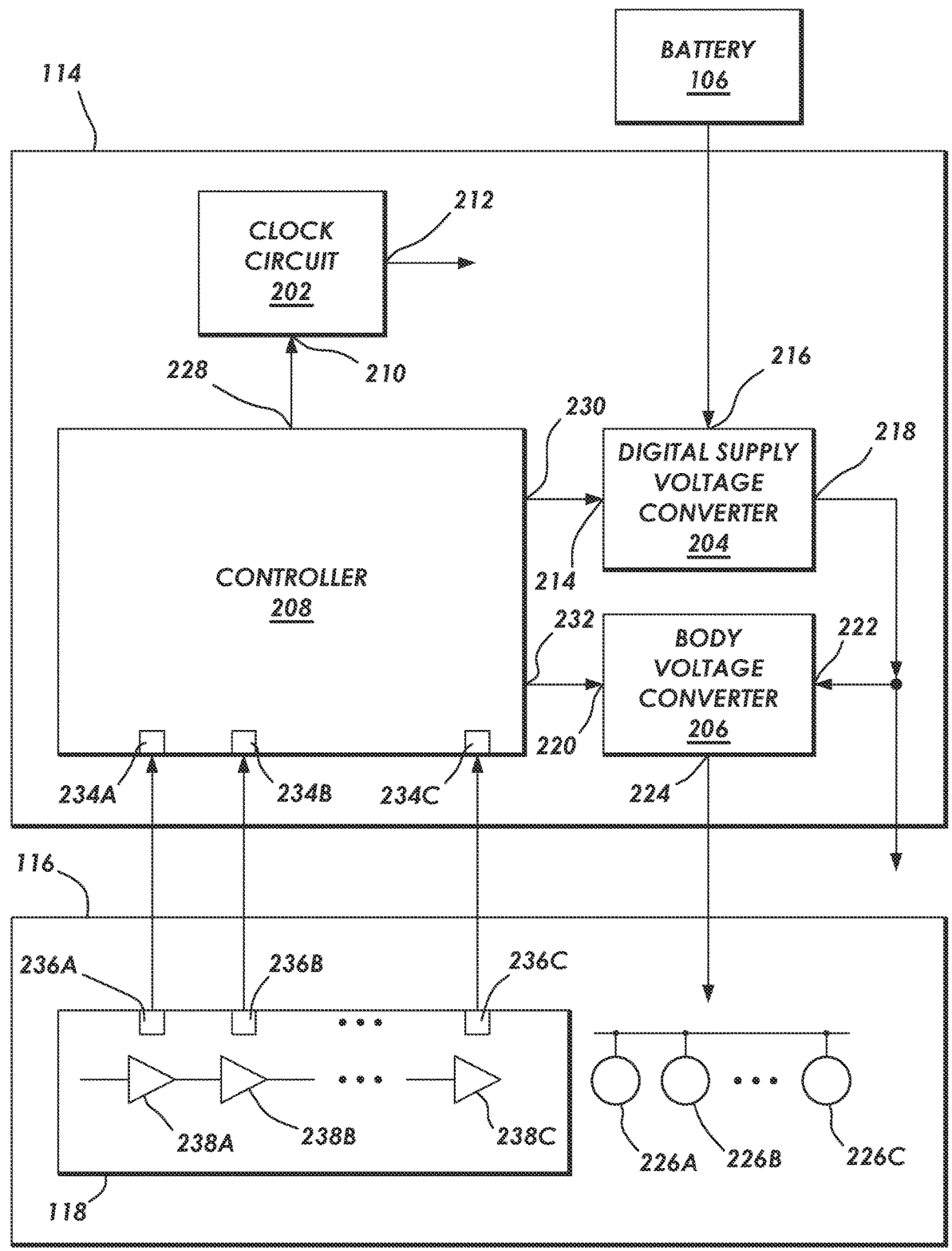
FIG. 2 is a block diagram of an example of a management module and a processing core included in the integrated circuit of FIG. 1 in accordance with some implementations.

FIG. 2 is an example of a block diagram of the management module 114 and the processing core 116 in accordance with some implementations of the present disclosure. The management module 114 illustrated in FIG. 2 includes a clock circuit 202, a digital supply voltage converter 204, a body voltage converter 206, and a controller 208.

The clock circuit 202 is configured to generate clock signals. The clock circuit 202 illustrated in FIG. 2 includes a clock control input 210 and a clock signal output 212. The clock signal output 212 is coupled to and provides clock signals to all of the logic circuits of the integrated circuit 108. The clock circuit 202 may include any suitable device configured to generate clock signals. For example, the clock circuit 202 may include clock configuration registers, system clock source selectors, system clock dividers/multipliers, oscillators, resistors, capacitors, amplifiers, or a combination thereof.

The digital supply voltage converter 204 is configured to generate a digital supply voltage. The digital supply voltage converter 204 illustrated in FIG. 2 includes a digital control input 214, a digital supply input 216, and a digital supply voltage output 218. The digital supply input 216 is coupled to the battery 106 to receive a supply voltage therefrom. The digital supply voltage output 218 is coupled to and provides operational power to the logic circuits of the integrated circuit 108. The digital supply voltage converter 204 may include any suitable device configured to generate a digital supply voltage based on a supply voltage from the battery 106. For example, the digital supply voltage converter 204 may include a charge pump configured to generate an output voltage that may be a predetermined ratio of the supply voltage. The ratio may be programmable to any suitable value. Suitable values may include ratios such as '1/1' (LDO mode, charge pump disabled), '4/5', '3/4', '2/3', '1/2', and '1/3'. Thus, by changing the ratio and/or the operating frequency, the digital supply voltage may be selectively controlled. In some implementations, the digital supply voltage converter 204 may include a switched-mode power converter configured to generate a modified output voltage by varying a duty cycle of a switching device. Alternatively, or in addition, the digital supply voltage converter 204 may include a linear regulator comprising a step-down converter configured to modify a digital supply voltage. Alternatively, or in addition, the linear regulator may be combined with another device (for example, a charge pump or a switched-mode power converter) to supply and regulate the digital supply voltage.

The body voltage converter 206 is configured to generate one or more body biasing voltages. The body voltage converter 206 illustrated in FIG. 2 includes a body control input 220, a body supply input 222, and a body voltage output 224. The body supply input 222 is coupled to the digital supply voltage output 218. The body voltage output 224 is coupled to a plurality of body connections of transistors within the processing core 116 (not specifically shown). For example, the body voltage output 224 may be configured to provide a body biasing voltage for N-type metal-oxide-semiconductor (NMOS) transistors and a body biasing voltage for P-type metal-oxide-semiconductor (PMOS) transistors. As generally shown in FIG. 2, the body voltage output 224 is coupled to the body connections of a plurality of transistors 226A, 226B, and 226C of the processing core 116. While only three transistors are shown in FIG. 2 so as not to unduly complicate the figure, the body voltage output 224 may be coupled to any suitable number of transistors, including all of the transistors of the processing core 116. The body voltage converter 206 may be configured to modify the body biasing voltage associated with or applied to the plurality of transistors 226A, 226B, and 226C. Modifying the body biasing voltage may, for example, enable changing a threshold voltage associated with the plurality of transistors 226A, 226B, and 226C to modify transistor speed, thereby modifying associated leakage current. For example, the body voltage converter 206 may be configured to apply a body biasing voltage to change the threshold voltage, to alter transistor speed.

The controller 208 is configured to determine the speed of the digital logic and to determine the lowest possible digital supply voltage using the lowest possible body biasing voltage, as will be described in more detail below. The controller 208 illustrated in FIG. 2 includes a clock control output 228 coupled to the clock control input 210 of the clock circuit 202. The clock circuit 202 is configured to adjust a frequency of the clock signal responsive to one or more signals driven by the controller 208 onto the clock control input 210. The controller 208 illustrated in FIG. 2 also includes a digital supply control output 230 coupled to the digital control input 214 of the digital supply voltage converter 204. The digital supply voltage converter 204 is configured to adjust the digital supply voltage responsive to one or more signals driven by the controller 208 onto the digital control input 214. The controller 208 illustrated in FIG. 2 further includes a body control output 232 coupled to the body control input 220 of the body voltage converter 206. The body voltage converter 206 is configured to adjust the body biasing voltage responsive to one or more signals driven by the controller 208 onto the body control input 220. The controller 208 illustrated in FIG. 2 also includes a plurality of gate inputs 234A, 234B, and 234C. Additional input and output connections will be present (for example, power connections, reference voltage connections, and ground connections), but those additional input and outputs connections are not shown so as not to unduly complicate the figure.

The controller 208 is configured to determine the speed of the digital logic using the logic gate delay line 118 embedded within the processing core 116. The logic gate delay line 118 illustrated in FIG. 2 includes a plurality of logic gate outputs 236A, 236B, and 236C coupled to the plurality of gate inputs 234A, 234B, and 234C of the controller 208. While only three logic gate outputs are shown in FIG. 2 (and thus only three gate inputs are shown), the logic gate delay line 118 may include any suitable number of logic gate outputs. In some implementations, the number of logic gate outputs depends on the number of bits specified for the result. For example, seven logic gate outputs may be suitable for a three-bit result. In another example, fifteen logic gate outputs may be suitable for a four-bit result. The logic gate delay line 118 illustrated in FIG. 2 also includes a plurality of delay elements 238A, 238B, and 238C coupled to the plurality of logic gate outputs 236A, 236B, and 236C. While only three delay elements are shown in FIG. 2, the logic gate delay line 118 may include any suitable number of delay elements. The plurality of delay elements 238A, 238B, and 238C may include a plurality of serially-aligned buffers. Each of the plurality of logic gate outputs 236A, 236B, and 236C may include the logic output of a flip-flop. In some implementations, each of the plurality of logic gate outputs 236A, 236B, and 236C may include a flip-flop that is further associated with re-capture logic (not shown). For example, the re-capture logic may include a multiplexer, configured to reduce a meta-stability by feeding a captured signal first into a multiplexer and then into a logic gate output. In some implementations, in a following clock cycle, the signal may be fed back into the multiplexer input and then logic gate output, to achieve resynchronization. The delay line of the logic gate delay line 118 may be placed along and run beside the longest physical digital logic processing path within the processing core 116. The integrated circuit 108 may include more than one logic gate delay line. In some implementations, the integrated circuit 108 may comprise a plurality of logic gate delay lines configured to decrease effects of on-chip process variations.

The logic gate delay line 118 is configured to produce a logic speed measurement or measurement result read by the controller 208. In particular, when the logic gate delay line 118 is in operation, a transition is driven onto the logic gate delay line 118. For instance, the transition may comprise a de-asserted state transitioning into an asserted state, or an asserted state transitioning to a de-asserted state. The transition propagates along the logic gate delay line 118 through the various delay elements. The plurality of logic gate outputs 236A, 236B, and 236C capture the result at predetermined measurement points. For example, the plurality of logic gate outputs 236A, 236B, and 236C may capture the result a predetermined period of time after the transition is driven onto the logic gate delay line 118 or at a transition of the next clock cycle. A logic gate output, storing an initial '0' value, captures a '1' value when the signal indicative of the transition has propagated along the logic gate delay line 118 to reach the particular logic gate output. As such, which of the plurality of logic gate outputs 236A, 236B, and 236C capture a '1' value responsive to a transition is indicative of the propagation distance along the logic gate delay line 118 within a predetermined period, based on which a logic speed measurement is determined by the controller 208.

The logic gate delay line 118 may include a synthesized logic block including a plurality of standard cells (for example, buffers and logic AND gates). The verification scheme for the logic gate delay line 118 may include a static timing analysis (STA) based on a plurality of standard cells under operating conditions that may include Process-Voltage-Temperature (PVT) and/or clock frequency. Inasmuch as the logic gate delay line 118 resides alongside a path (for example, the longest path) through the processing core 116, the logic gate delay line 118 may thus include a comparison to a computation path through the integrated circuit 108. Thus, the results of the logic gate delay line 118 (for example, how far along the logic gate delay line 118 an asserted or de-asserted state propagates within a predetermined period of time) may be indicative of the speed margin of the processing core 116.

The controller 208 is configured to read the plurality of logic gate outputs 236A, 236B, and 236C from the logic gate delay line 118 and determine logic speed measurements based on the readings. More particularly, the controller 208 reads the plurality of logic gate outputs 236A, 236B, and 236C indicating a distance along the logic gate delay line 118 a transition (for example, asserted state) propagated within a predetermined period of time. Consider, as an example, that the logic gate delay line 118 includes ten logic gates, and thus ten logic gate outputs. Further consider that the logic gates are reset or de-asserted prior to starting a test. In an example case, an asserted state is applied to the first logic gate on a first edge of a clock signal, and then the state of each of the plurality of logic gate outputs 236A, 236B, and 236C is read on the next edge of the clock signal. If the asserted state propagated halfway along the logic gate delay line 118, the reading may take the form 1111100000 for a particular combination of clock frequency and applied voltage. If the clock frequency is increased (all other things held equal), the next logic speed measurement may be 1100000000 because there is less time for the asserted state to propagate. Oppositely, if the clock frequency is decreased (all other things equal), another logic speed measurement line might be 1111111100 because there is more time for the asserted state to propagate.

The controller 208 is further configured to determine speed margins based on logic speed measurements. A speed margin represents the difference between a logic speed measurement and a target speed value. The target speed value may be determined using STA and/or during characterization of the integrated circuit 108 after manufacture. Thus, the target speed may account for variations caused by differences in manufacturing (for example, slighting doping differences, variance in line widths, variance in oxide thicknesses, and the like), and clock jitter. The higher a number corresponding to the entirety of values captured by the plurality of logic gate outputs 236A, 236B, and 236C (i.e., the farther along the logic gate delay line 118 a transition propagates), the higher the speed margin. Conversely, the lower a number corresponding to the entirety of values captured by the plurality of logic gate outputs 236A, 236B, and 236C, the lower the speed margin. Consider, as an example, that the target speed value directly or indirectly indicates that, in a implementation with ten gates in the logic gate delay line 118, the target speed value is met when the asserted state propagates through five of the ten gates (for example, the target reading may be 1111100000). If a logic speed measurement produces a reading of, for example, 1111110000, then the controller 208 determines a speed margin that is an incremental distance of one logic gate beyond the target point. Further, if a logic speed measurement produces a reading of, for example, 1111111100, then the controller 208 determines a speed margin that is an incremental distance of three logic gates beyond the target point. The controller 208 may not need to work directly with the position-coded example results shown above. The controller 208 may, for example, encode the distance result as a magnitude of a number having a smaller number of bits (for example, three-bit result for a logic gate delay line of seven gates, or a four-bit result for a logic gate delay line of fifteen gates).

A target margin is the minimum speed margin at which the digital logic is fast enough to complete all timing paths (with a safety margin). A target margin is specific to, among other things, clock frequency. Thus, target margins may be determined for each clock configuration implemented within the integrated circuit 108. For example, a first target margin may be determined for a clock configuration in which the clock frequency is 16 megahertz and a second target margin may be determined for a separate clock configuration in which the clock frequency is 48 megahertz. Target margins may be determined using STA and/or during characterization of the integrated circuit 108 after manufacture.

The controller 208 is configured to adjust the digital supply and body biasing voltages to the lowest possible values at which the speed margin of the integrated circuit 108 is in a steady-state close to the target margin. As described above, the target margin varies for different clock configurations. Thus, the lowest possible digital supply and body biasing voltages at which the speed margin of the integrated circuit 108 is in a steady-state close to the target margin can be different for different clock configurations. Further, due to changes in operating conditions over time (such as temperature), the lowest possible digital supply and body biasing voltages at which the speed margin of the integrated circuit 108 is in a steady-state close to the target margin for a current clock configuration may change over time. Thus, whenever the clock configuration changes, the controller 208 dynamically adjusts the digital supply and body biasing voltages to the lowest possible values at which the speed margin of the integrated circuit 108 is in a steady-state close to the target margin of the newly-implemented clock configuration. The longer it takes for the controller 208 to adjust the digital supply and body biasing voltages, the more power is consumed. Thus, to speed up the process, when the clock configuration changes, the controller 208 is configured to quickly adjust to the lowest possible digital supply voltage using a last known optimal body biasing voltage for the newly-implemented clock configuration, as will be described in more detail below. In some implementations, to further speed up the process, the controller 208 is configured to measure speed margins of the digital logic components at short time intervals when the clock configuration changes to quickly adjust the digital supply voltage to a value close to the lowest possible value, as also will be described in more detail below.

Figure 3:
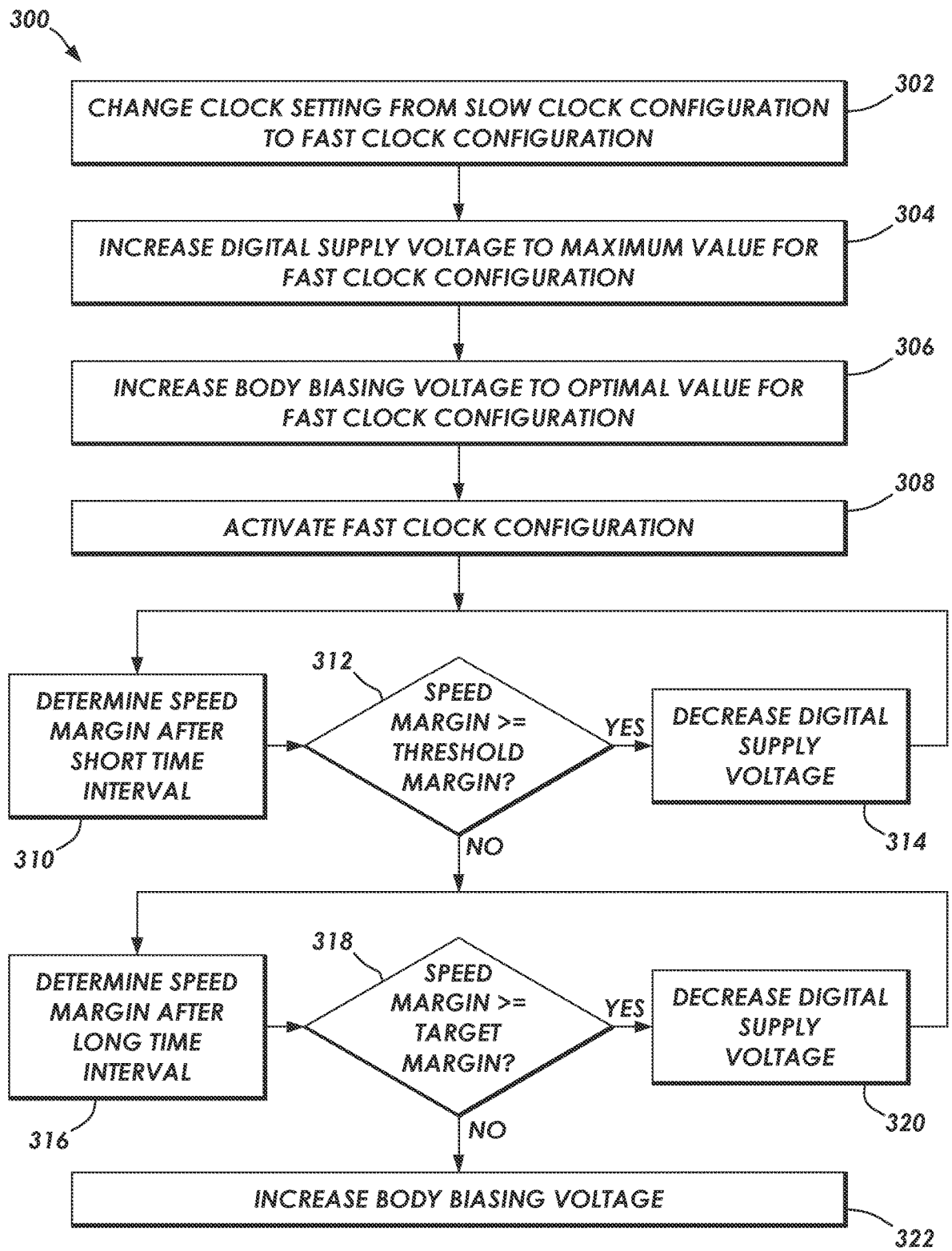
FIG. 3 is a flow diagram of an example of a method for operating an integrated circuit when switching from a slow clock configuration to a fast clock configuration in accordance with some implementations.

FIG. 3 is a flow diagram of an example of a method 300 for operating the integrated circuit 108 when switching from a slow clock configuration to a fast clock configuration in accordance with some implementations. At block 302, the clock settings of the clock circuit 202 are changed from a slow clock configuration to a fast clock configuration. For example, the controller 208 may send one or more control signals to the clock circuit 202 which cause the clock circuit 202 to adjust the frequency of the clock signal from 16 megahertz to 48 megahertz. In some implementations, to switch from the slow clock configuration to the fast clock configuration, the controller 208 may write to a clock configuration register included in the clock circuit 202. The fast clock configuration is not activated immediately after the clock settings are changed.

At block 304, the digital supply voltage is increased to a maximum value for the fast clock configuration. For example, the controller 208 may send one or more control signals to the digital supply voltage converter 204 which cause the digital supply voltage converter 204 to increase the digital supply voltage to a maximum value for the fast clock configuration. The maximum value for the fast clock configuration is the maximum digital supply voltage at which the digital logic is fast enough to complete all timing paths under the worst case scenario for the fast clock configuration. The maximum value for the fast clock configuration may be determined via STA analysis. For example, the maximum value of the digital supply voltage may be approximately 0.72 Volts when the fast clock configuration has a 48 Megahertz clock. The maximum value for the fast clock configuration is an example of a "predetermined maximum value for the first frequency" and a "predetermined maximum value for the second frequency."

At block 306, the body biasing voltage is increased to an optimal value for the fast clock configuration. For example, the controller 208 may send one or more control signals to the body voltage converter 206 which cause the body voltage converter 206 to increase the body biasing voltage to an optimal value for the fast clock configuration. The optimal value for the fast clock configuration may be the last known body biasing voltage when the integrated circuit 108 last switched away from the fast clock configuration. In some implementations, the optimal value for the fast clock configuration is stored in a register of the controller 208 and is updated when the integrated circuit 108 switches away from the fast clock configuration. The optimal value for the fast clock configuration is an example of a "predetermined optimal value for the first frequency" and a "predetermined optimal value for the second frequency."

At block 308, the fast clock configuration is activated. At block 310, the controller 208 determines a speed margin after a short time interval. For example, the controller 208 may wait for two microseconds before determining a speed margin. The controller 208 may determine a speed margin using any of the techniques described herein. At block 312, the controller 208 determines whether the speed margin is greater than or equal to a threshold margin for the fast clock configuration. The threshold margin for the fast clock configuration is slightly greater than a minimum speed margin at which the digital logic is fast enough to complete all timing paths (with a safety margin) under the fast clock configuration. The threshold margin for the fast clock configuration is an example of a "predetermined threshold margin for the first frequency" and a "predetermined threshold margin for the second frequency." When the speed margin is greater than the threshold margin for the fast clock configuration, the digital supply voltage is decreased at block 314. For example, the digital supply voltage converter 204 may decrease the digital supply voltage by 2.5 millivolts. In some implementations, if the digital supply voltage is less than or equal to a predetermined minimum value, the body biasing voltage is decreased instead on the digital supply voltage. For example, the body biasing voltage may be decreased when the digital supply voltage is less than or equal to 0.45 Volts. Next, the method 300 returns to block 310 and the controller 208 determines a speed margin again after the short time interval.

Returning to block 312, when the speed margin is less than the threshold margin for the fast clock configuration, the controller 208 determines the speed margin after a long time interval at block 316. For example, the controller 208 may wait for thirty-two microseconds before determining a speed margin again. Next, at block 318, the controller 208 determines whether the speed margin is greater than or equal to a target margin for the fast clock configuration. The target margin for the fast clock configuration is the minimum speed margin at which the digital logic is fast enough to complete all timing paths (with a safety margin) under the fast clock configuration. The target margin for the fast clock configuration may be determined via STA analysis. The target margin for the fast clock configuration is an example of a "predetermined target margin for the first frequency" and a "predetermined target margin for the first frequency." In some implementations, the target margin for the fast clock configuration is less than the threshold margin for the fast clock configuration. In alternate implementations, the target margin for the fast clock configuration is equal to the threshold margin for the fast clock configuration. When the speed margin is greater than the target margin for the fast clock configuration, the digital supply voltage is decreased again at block 320. Next, the method 300 returns to block 316 and the controller 208 determines a speed margin again after the long time interval.

Returning to block 318, when the speed margin is less than the target margin for the fast clock configuration, the body biasing voltage is increased at block 322. For example, the body biasing voltage may be increased by 6.25 millivolts. In some implementations, the digital supply voltage is increased instead when the speed margin is less than the target margin for the fast clock configuration. For example, the digital supply voltage may be increased when the body biasing voltage is equal to a predetermined maximum value. In the manner, the speed margin is quickly increased to ensure that the next measurement of the speed margin is slightly above the target margin for the fast clock configuration.

Figure 4A:
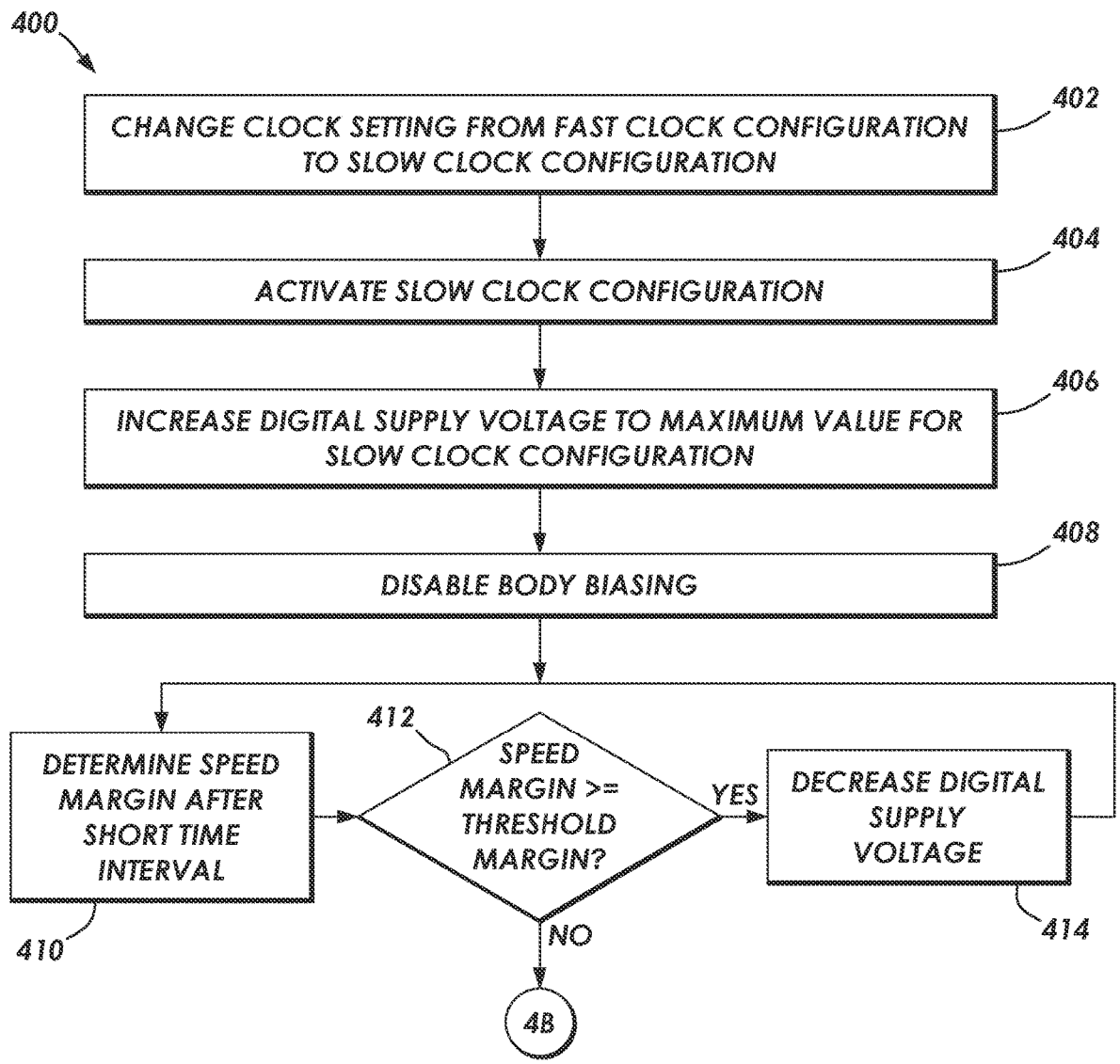
FIGS. 4A and 4B are a flow diagram of an example of a method for operating an integrated circuit when switching from a fast clock configuration to a slow clock configuration in accordance with some implementations.
Figure 4B:
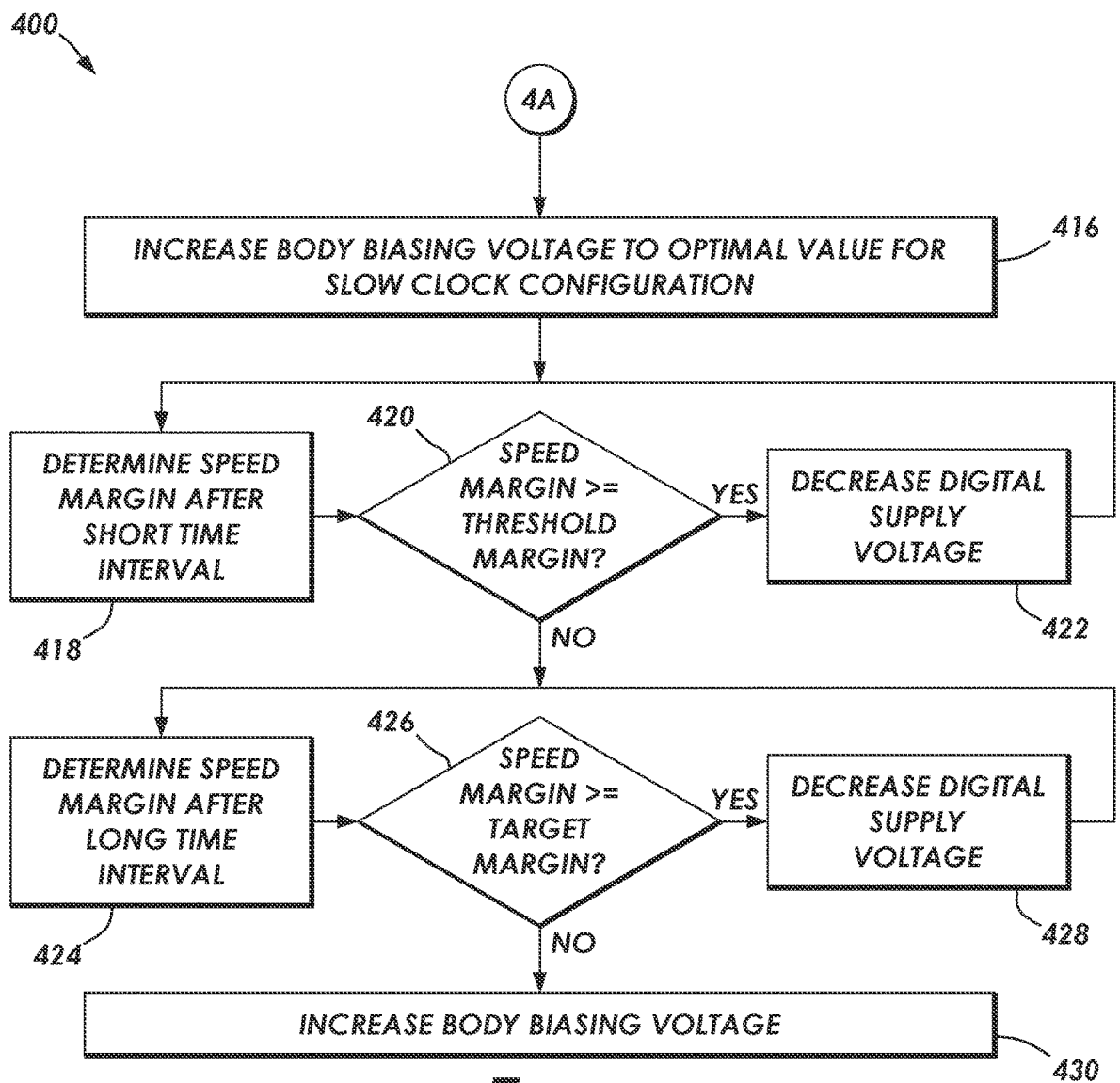

FIGS. 4A and 4B are a flow diagram of an example of a method 400 for operating the integrated circuit 108 when switching from a fast clock configuration to a slow clock configuration in accordance with some implementations. At block 402, the clock settings of the clock circuit 202 are changed from a fast clock configuration to a slow clock configuration. For example, the controller 208 may send one or more control signals to the clock circuit 202 which cause the clock circuit 202 to adjust the frequency of the clock signal from 48 megahertz to 16 megahertz. In some implementations, the controller 208 may write to a clock configuration register included in the clock circuit 202 to switch from the fast clock configuration to the slow clock configuration. At block 404, the slow clock configuration is activated.

At block 406, the digital supply voltage is increased to a maximum value for the slow clock configuration. For example, the controller 208 may send one or more control signals to the digital supply voltage converter 204 which cause the digital supply voltage converter 204 to increase the digital supply voltage to the maximum value for the slow clock configuration. The maximum value for the slow clock configuration may be determined via STA analysis. For example, the maximum value of the digital supply voltage may be approximately 0.45 Volts when the fast clock configuration has a 16 Megahertz clock. The maximum value for the slow clock configuration is an example of a "predetermined maximum value for the first frequency" and a "predetermined maximum value for the second frequency."

An optimal value for the slow clock configuration may be the last known body biasing voltage when the integrated circuit 108 last switched away from the slow clock configuration. When changing from a fast clock configuration to a slow clock configuration, the optimal value for the slow clock configuration is typically lower than the steady-state value of the body biasing voltage in the fast clock configuration. In some implementations, the body voltage converter 206 lowers the body biasing voltage much slower than the digital supply voltage converter 204. Thus, at block 408, body biasing is disabled by coupling an output of the body voltage converter 206 to a reference terminal. For example, the body voltage output 224 may be coupled to a ground terminal to quickly lower the body biasing voltage.

At block 410, the controller 208 determines a speed margin after a short time interval. For example, the controller 208 may wait for two microseconds before determining a speed margin. The controller 208 may determine a speed margin using any of the techniques described herein. At block 412, the controller 208 determines whether the speed margin is greater than or equal to a threshold margin for the slow clock configuration. The threshold margin for the slow clock configuration is slightly greater than a minimum speed margin at which the digital logic is fast enough to complete all timing paths (with a safety margin) under the slow clock configuration. The threshold margin for the slow clock configuration is an example of a "predetermined threshold margin for the first frequency" and a "predetermined threshold margin for the second frequency." In some implementations, the threshold margins for the slow and fast clock configurations are the same. In alternate implementations, the threshold margins for the slow and fast clock configurations differ based on the amount of body biasing voltage applied. When the speed margin is greater than or equal to the threshold margin for the slow clock configuration, the digital supply voltage is decreased at block 414. For example, the digital supply voltage converter 204 may decrease the digital supply voltage by 2.5 millivolts. Next, the method 400 returns to block 410 and the controller 208 determines a speed margin again after the short time interval.

Returning to block 412, when the speed margin is less than the threshold margin, the body biasing voltage is increased to the optimal value for the slow clock configuration at block 416 in FIG. 4B. For example, the controller 208 may send one or more control signals to the body voltage converter 206 which cause the body voltage converter 206 to increase the body biasing voltage to the optimal value for the slow clock configuration. As described above, the optimal value for the slow clock configuration may be the last known body biasing voltage when the integrated circuit 108 last switched away from the slow clock configuration. In some implementations, the optimal value for the slow clock configuration is stored in a register of the controller 208 and is updated when the integrated circuit 108 switches away from the slow clock configuration. The optimal value for the slow clock configuration is an example of a "predetermined optimal value for the first frequency" and a "predetermined optimal value for the second frequency."

Next, at block 418, the controller 208 determines a speed margin after the short time interval. For example, the controller 208 may wait for two microseconds before determining a speed margin again. In some implementations, the controller 208 waits for a longer time interval after the body biasing voltage is increased to allow the body biasing voltage to stabilize. For example, the controller 208 may wait between eight microseconds and sixteen microseconds after the body biasing voltage is increased before determining a speed margin again. At block 420, the controller 208 determines whether the speed margin is greater than or equal to the threshold margin for the slow clock configuration. When the speed margin is greater than or equal to the threshold margin for the slow clock configuration, the digital supply voltage is decreased at block 422. Next, the method 400 returns to block 418 and the controller 208 determines a speed margin again after the short time interval. Alternatively, when the speed margin is less than the threshold margin for the slow clock configuration, the controller 208 determines the speed margin after a long time interval at block 424. For example, the controller 208 may wait for thirty-two microseconds before determining a speed margin again. Next, at block 426, the controller 208 determines whether the speed margin is greater than or equal to a target margin for the slow clock configuration. The target margin for the slow clock configuration is the minimum speed margin at which the digital logic is fast enough to complete all timing paths (with a safety margin) under the slow clock configuration. The target margin for the slow clock configuration may be determined via STA analysis. The target margin for the slow clock configuration is an example of a "predetermined target margin for the first frequency" and a "predetermined target margin for the first frequency." In some implementations, the target margin for the slow clock configuration is less than the threshold margin for the slow clock configuration. In alternate implementations, the target margin for the slow clock configuration is equal to the threshold margin for the slow clock configuration. When the speed margin is greater than or equal to the target margin for the slow clock configuration, the digital supply voltage is decreased again at block 428. Next, the method 400 returns to block 424 and the controller 208 again determines a speed margin after the short time interval.

Returning to block 426, when the speed margin is less than the target margin for the slow clock configuration, the body biasing voltage is increased at block 430. For example, the body biasing voltage may be increased by 6.25 millivolts. In some implementations, the digital supply voltage is increased instead when the speed margin is less than the target margin for the slow clock configuration. For example, the digital supply voltage may be increased when the body biasing voltage is equal to a predetermined maximum value.

Figure 5:
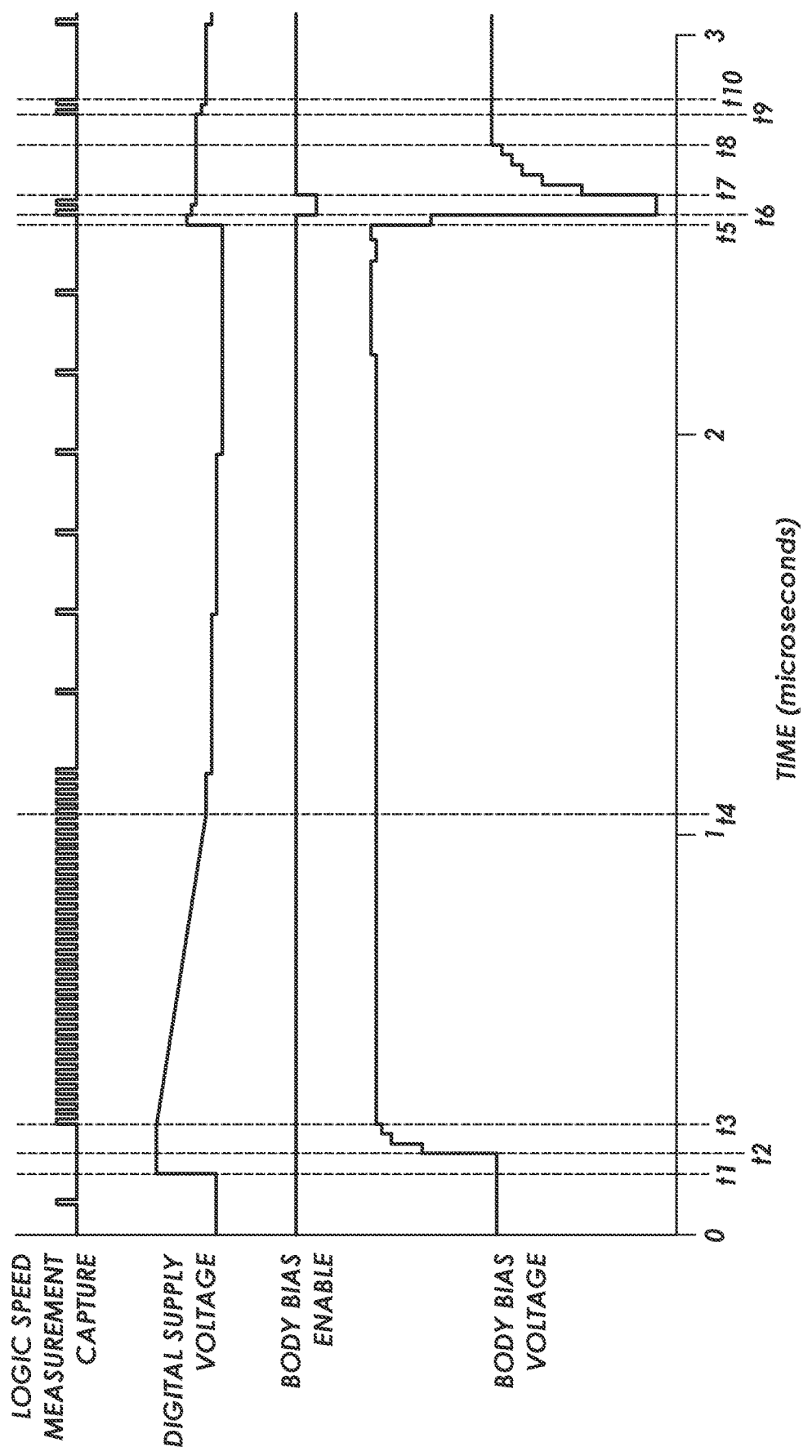
FIG. 5 is a timing diagram of an example operation of an integrated circuit switching from a slow clock configuration to a fast clock configuration, and then back to the slow clock configuration in accordance with some implementations.

FIG. 5 is a timing diagram of an example operation of the integrated circuit 108 switching from a slow clock configuration to a fast clock configuration. At time t1, the digital supply voltage increases to a maximum value for the fast clock configuration (similar to block 304). At time t2, the body biasing voltage increases to an optimal value for the fast clock configuration (similar to block 306). At time t3, the controller 208 starts determining speed margins at short time intervals (similar to block 310). Also, at time t3, the digital supply voltage decreases until the speed margin is less than a threshold margin for the fast clock configuration. When the speed margin is less than the threshold margin for the fast clock configuration at time t4, the controller 208 changes to determining speed margins at long time intervals (similar to block 316).

The timing diagram of FIG. 5 also includes an example operation of the integrated circuit 108 switching back from the fast clock configuration to the slow clock configuration. At time t5, the digital supply voltage increases to a maximum value for the slow clock configuration (similar to block 406). At time t6, body biasing is disabled (similar to block 408) and the body bias voltage decreases to a reference value. Also, at time t6, the controller 208 starts determining speed margins at short time intervals (similar to block 410). Further, at time t6, the digital supply voltage decreases until the speed margin is less than a threshold margin for the slow clock configuration. When the speed margin is less than the threshold margin for the slow clock configuration at time t7, body biasing is enabling and the body bias voltage increases to an optimal value for the slow clock configuration (similar to block 416). After the body biasing voltage increases to the optimal value for the slow clock, at time t8, the controller 208 waits for a long time interval for the body biasing voltage to stabilize (for example, between eight microseconds and sixteen microseconds). After the long time interval, at time t9, the controller 208 starts determining speed margins at short time intervals (similar to block 418). Further, at time t9, the digital supply voltage decreases until the speed margin is less than a threshold margin for the slow clock configuration. When the speed margin is less than the threshold margin for the slow clock configuration at time t10, the controller 208 changes to determining speed margins at long time intervals.

Figure 6:
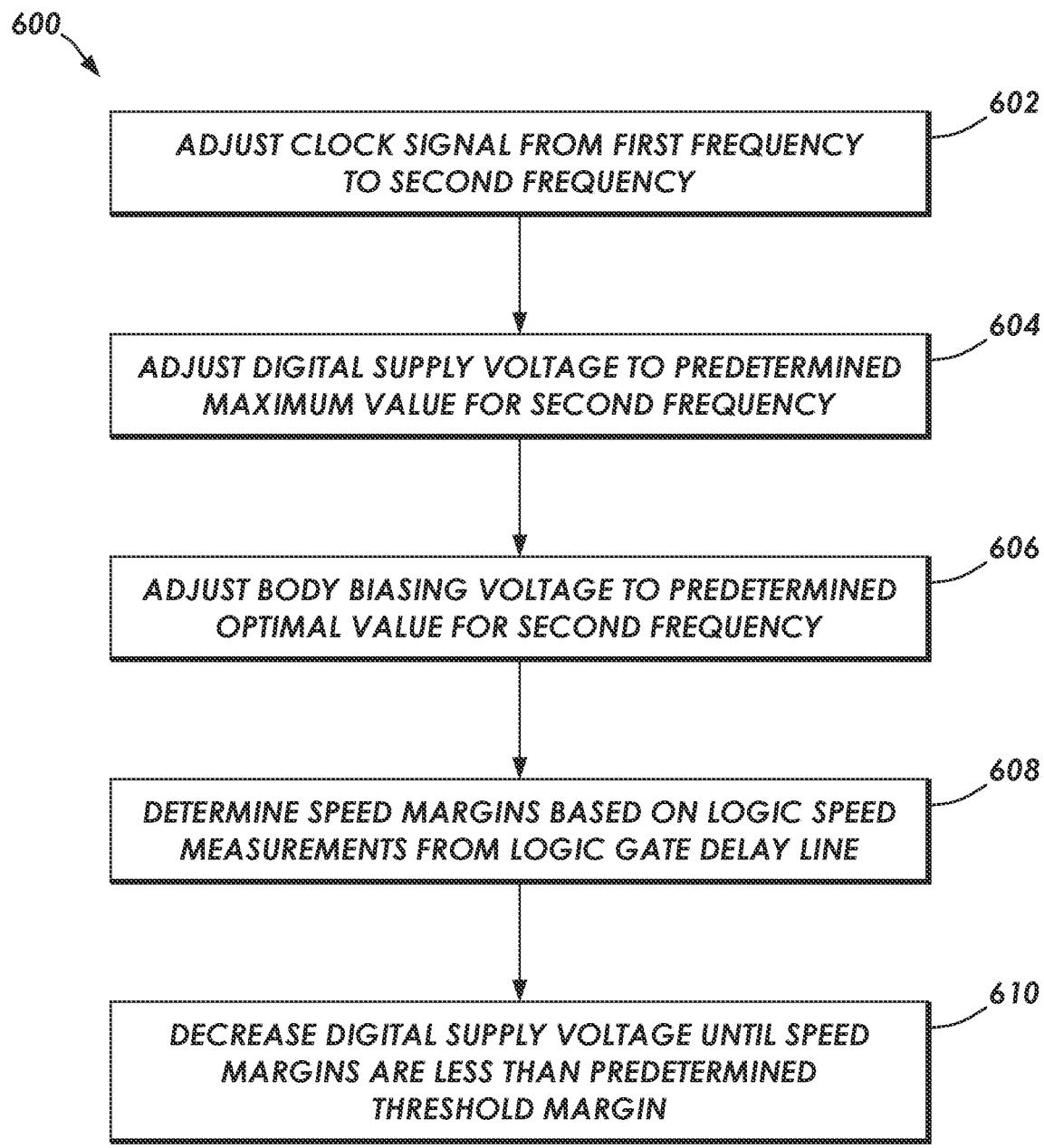
FIG. 6 is a flow diagram of an example of a method for operating an integrated circuit in accordance with some implementations.

FIG. 6 is a flow diagram of an example of a method 600 for operating the integrated circuit 108 in accordance with some implementations. At block 602, the clock signal, generated by the clock circuit 202, is adjusted from a first frequency to a second frequency. For example, the controller 208 may send one or more control signals to the clock circuit 202 which cause the clock circuit 202 to adjust the frequency of the clock signal from the first frequency to the second frequency. In some implementations, the controller 208 may write to a clock configuration register included in the clock circuit 202 to switch from the first frequency to the second frequency. At block 604, the digital supply voltage, generated by the digital supply voltage converter 204, is adjusted to a predetermined maximum value for the second frequency. At block 606, the body biasing voltage, generated by the body voltage converter 206, is adjusted to a predetermined optimal value for the second frequency. At block 608, speed margins are determined, by the controller 208, based on logic speed measurements from the logic gate delay line 118. At block 610, the digital supply voltage is decreased until the speed margins are less than a predetermined threshold margin.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. A method for operating an integrated circuit on a semiconductor substrate, the method comprising:
    adjusting a clock signal, generated by a clock circuit, from a first frequency to a second frequency;
    adjusting a digital supply voltage, generated by a digital supply voltage converter, to a predetermined maximum value for the second frequency;
    determining, by a controller, speed margins based on logic speed measurements from a logic gate delay line after a first time interval when the speed margins are greater than or equal to a predetermined threshold margin;
    decreasing the digital supply voltage until the speed margins are less than the predetermined threshold margin; and
    determining, by the controller, the speed margins based on the logic speed measurements from the logic gate delay line after a second time interval when the speed margins are less than the predetermined threshold margin, wherein the second time interval is longer than the first time interval.

2. The method of claim 1, further comprising:
    adjusting a body biasing voltage, generated by a body voltage converter, to a predetermined value for the second frequency;
    decreasing the digital supply voltage until the speed margins are less than a predetermined target margin; and
    increasing the body biasing voltage when the speed margins are less than the predetermined target margin, wherein the predetermined target margin is less than the predetermined threshold margin.

3. The method of claim 1, further comprising:
    adjusting a body biasing voltage, generated by a body voltage converter, to a predetermined value for the second frequency; and
    decreasing the body biasing voltage when the digital supply voltage is less than or equal to a predetermined minimum value.

4. The method of claim 1, wherein the predetermined threshold margin is for the second frequency, wherein the method further comprises:
    adjusting the clock signal from the second frequency to the first frequency;
    adjusting the digital supply voltage to a predetermined maximum value for the first frequency; and
    decreasing the digital supply voltage until the speed margins are less than a predetermined threshold margin for the first frequency.

5. The method of claim 1, further comprising:
    coupling an output of a body voltage converter to a reference terminal to decrease a body biasing voltage, generated by the body voltage converter, below the predetermined value for the second frequency, and then increasing the body biasing voltage to the predetermined value for the second frequency.

6. The method of claim 1, wherein the clock signal is adjusted from the first frequency to the second frequency after the digital supply voltage is adjusted to the predetermined maximum value for the second frequency.

7. The method of claim 1, further comprising adjusting a body biasing voltage, generated by a body voltage converter, to a predetermined value for the second frequency, wherein the predetermined value for the second frequency is a last known value of the body biasing voltage when the clock signal was last adjusted away from the second frequency.

8. An integrated circuit on a semiconductor substrate, comprising:
    a processing core;
    a logic gate delay line embedded within the processing core;
    a clock circuit configured to generate a clock signal;
    a digital supply voltage converter configured to generate a digital supply voltage; and
    a controller configured to:
        adjust the clock signal from a first frequency to a second frequency,
        adjust the digital supply voltage to a predetermined maximum value for the second frequency,
        determine speed margins based on logic speed measurements from the logic gate delay line at a first measurement frequency when the speed margins are greater than or equal to a predetermined threshold margin,
        determine the speed margins based on the logic speed measurements from the logic gate delay line at a second measurement frequency when the speed margins are less than the predetermined threshold margin, wherein the second measurement frequency is less than the first measurement frequency, and
        decrease the digital supply voltage until the speed margins are less than the predetermined threshold margin.

9. The integrated circuit of claim 8, wherein the integrated circuit further comprises a body voltage converter configured to generate a body biasing voltage, and wherein the controller is further configured to:
    adjust the body biasing voltage to a predetermined value for the second frequency,
    decrease the digital supply voltage until the speed margins are less than a predetermined target margin, and
    increase the body biasing voltage when the speed margins are less than the predetermined target margin, wherein the predetermined target margin is less than the predetermined threshold margin.

10. The integrated circuit of claim 9, wherein the controller is further configured to increase the digital supply voltage when the speed margins are less than the predetermined target margin and the body biasing voltage is equal to a predetermined maximum value.

11. The integrated circuit of claim 8, wherein the predetermined threshold margin is for the second frequency, wherein the controller is further configured to:
adjust the clock signal from the second frequency to the first frequency,
adjust the digital supply voltage to a predetermined maximum value for the first frequency, and
decrease the digital supply voltage until the speed margins are less than a predetermined threshold margin for the first frequency.

12. The integrated circuit of claim 8, wherein the integrated circuit further comprises a body voltage converter configured to generate a body biasing voltage, and wherein the controller is further configured to:
couple an output of the body voltage converter to a reference terminal to decrease the body biasing voltage below the predetermined value for the second frequency, and then increase the body biasing voltage to the predetermined value for the second frequency.

13. The integrated circuit of claim 8, wherein the controller is further configured to adjust the clock signal from the first frequency to the second frequency after the digital supply voltage is adjusted to the predetermined maximum value for the second frequency.

14. An integrated circuit on a semiconductor substrate, comprising:
a processing core;
a system memory coupled to the processing core;
a communication bus coupled to the processing core;
a wireless communication circuit coupled to the communication bus and configured to communicate wirelessly to devices outside the integrated circuit; and
a controller configured to:
adjust a clock signal from a first frequency to a second frequency,
adjust a digital supply voltage to a predetermined maximum value for the second frequency,
determine speed margins based on logic speed measurements from the processing core after a first time interval when the speed margins are greater than or equal to a predetermined threshold margin,
decrease the digital supply voltage until the speed margins are less than the predetermined threshold margin, and
determine the speed margins based the logic speed measurements from the processing core after a second time interval when the speed margins are less than the predetermined threshold margin, wherein the second time interval is longer than the first time interval.

15. The integrated circuit of claim 14, wherein the controller is further configured to:
adjust a body biasing voltage to a predetermined value,
decrease the digital supply voltage until the speed margins are less than a predetermined target margin, and
increase the body biasing voltage when the speed margins are less than the predetermined target margin,
wherein the predetermined target margin is less than the predetermined threshold margin.

16. The integrated circuit of claim 14, wherein the predetermined value and the predetermined threshold margin are for the second frequency, wherein the controller is further configured to:
adjust the clock signal from the second frequency to the first frequency,
adjust the digital supply voltage to a predetermined maximum value for the first frequency, and
decrease the digital supply voltage until the speed margins are less than a predetermined threshold margin for the first frequency.

17. The integrated circuit of claim 14, wherein the controller is further configured to adjust the clock signal from the first frequency to the second frequency after the digital supply voltage is adjusted to the predetermined maximum value for the second frequency.

* * * * *